Oct. 3, 1944.   S. W. LANGDON   2,359,429
PHOTOGRAPHIC CAMERA
Filed July 29, 1943   10 Sheets-Sheet 1

INVENTOR.
Samuel W. Langdon
BY Harold E. Stonebraker,
his Attorney

Oct. 3, 1944.                S. W. LANGDON                2,359,429
                         PHOTOGRAPHIC CAMERA
                   Filed July 29, 1943        10 Sheets-Sheet 2
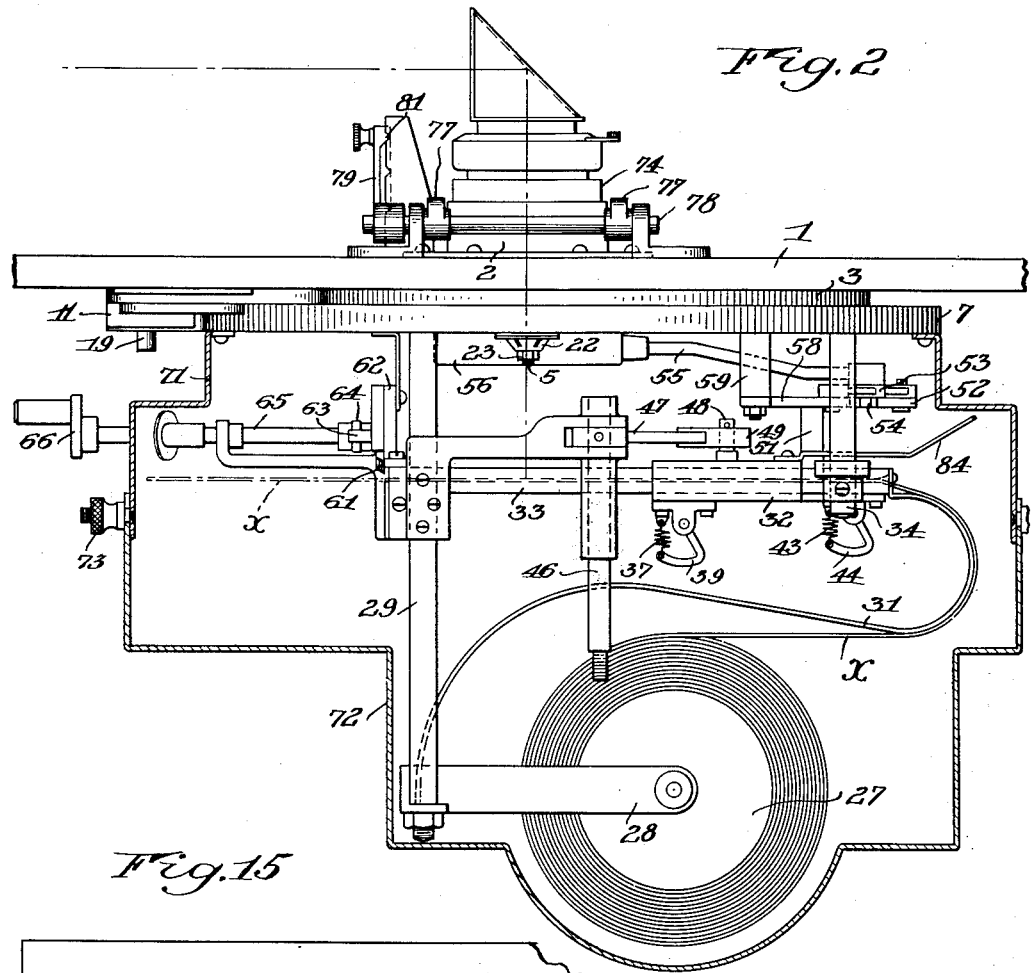
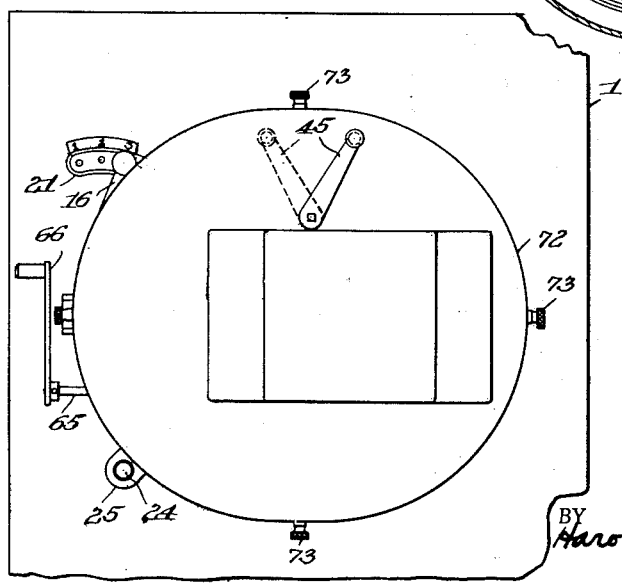
INVENTOR.
Samuel W. Langdon
BY Harold E. Stonebraker,
   his Attorney Oct. 3, 1944.   S. W. LANGDON   2,359,429
PHOTOGRAPHIC CAMERA
Filed July 29, 1943   10 Sheets-Sheet 3

INVENTOR.
Samuel W. Langdon
Harold E. Stonebraker
By his Attorney

Oct. 3, 1944.   S. W. LANGDON   2,359,429
PHOTOGRAPHIC CAMERA
Filed July 29, 1943   10 Sheets-Sheet 4
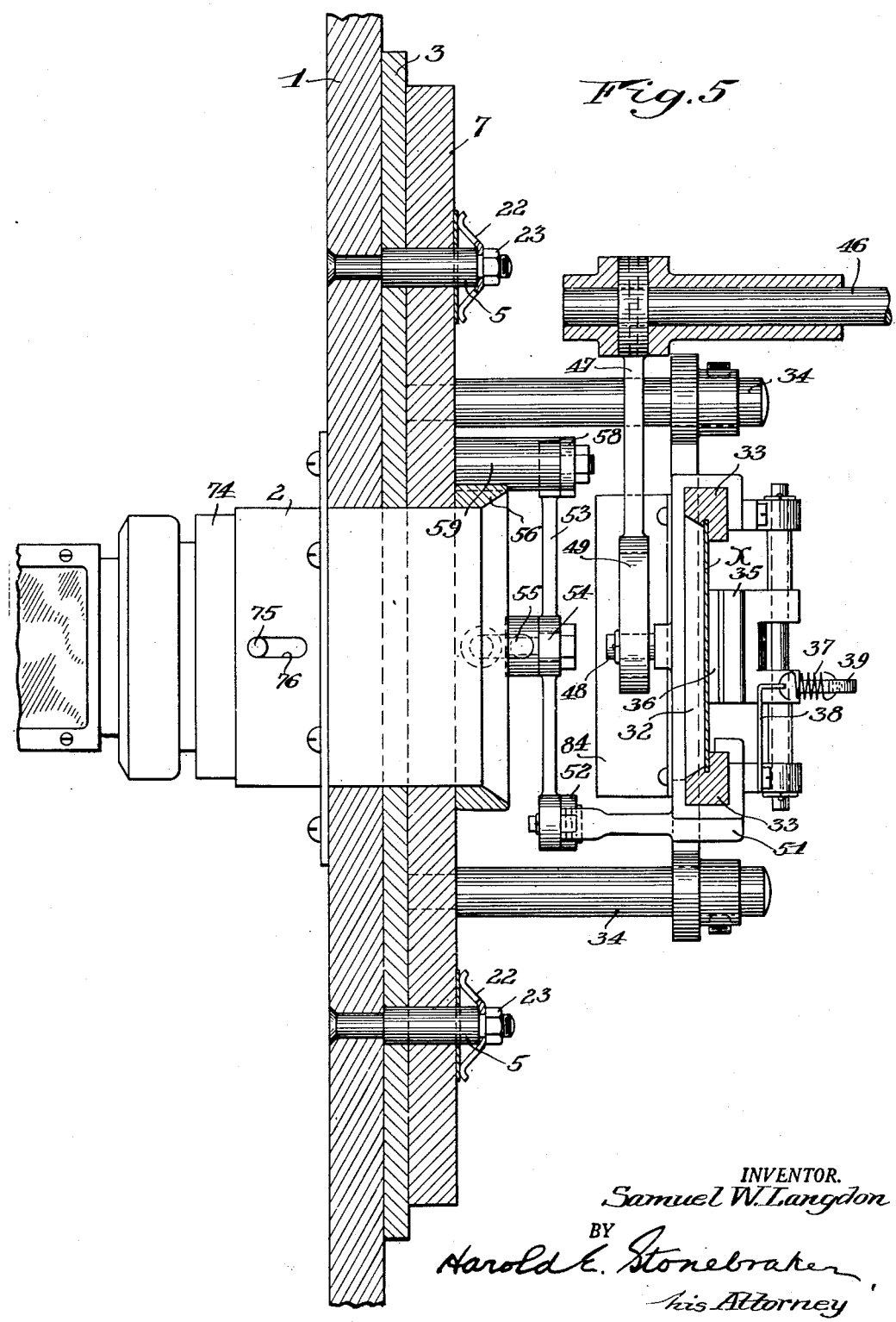
INVENTOR.
Samuel W. Langdon
BY Harold E. Stonebraker,
his Attorney

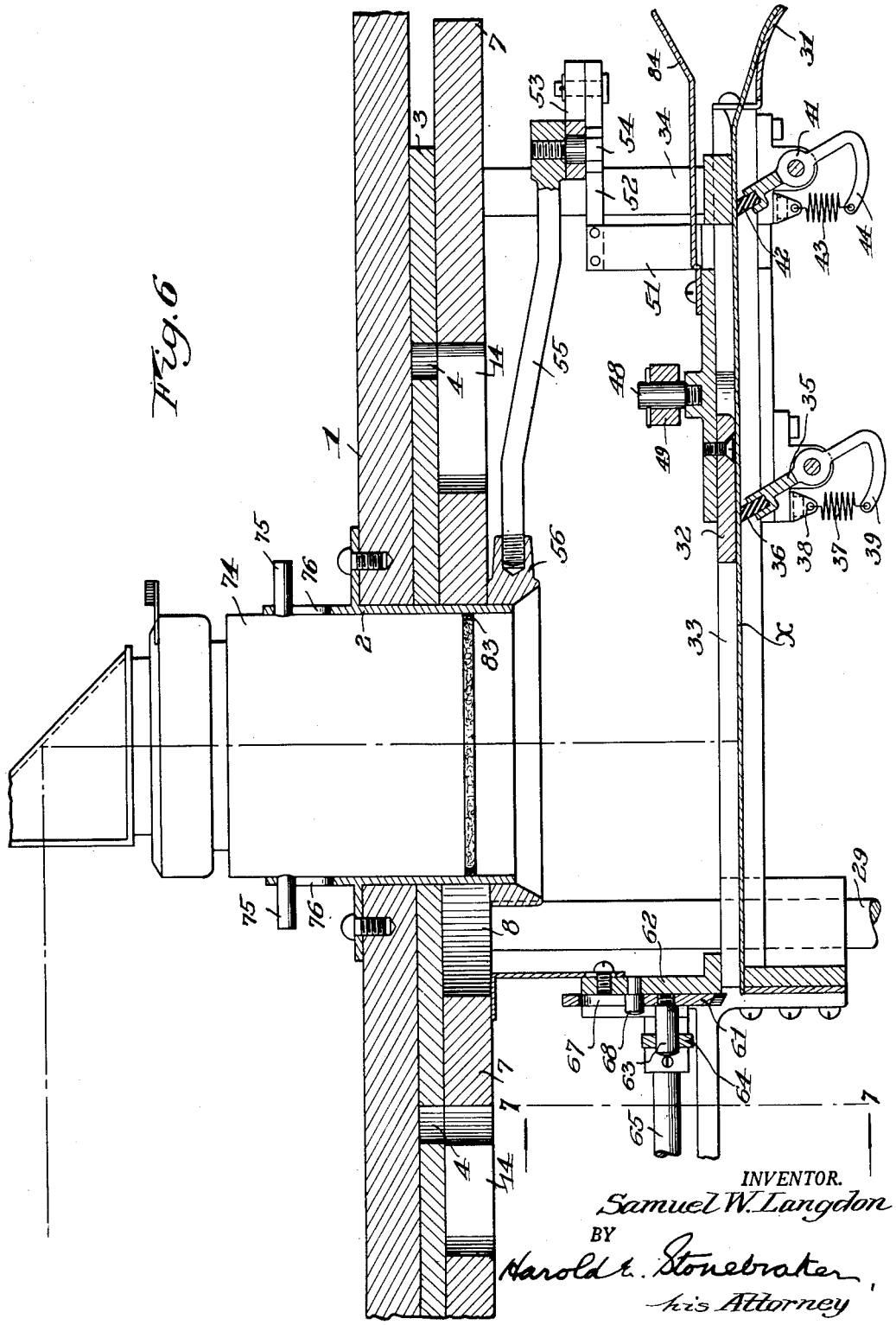

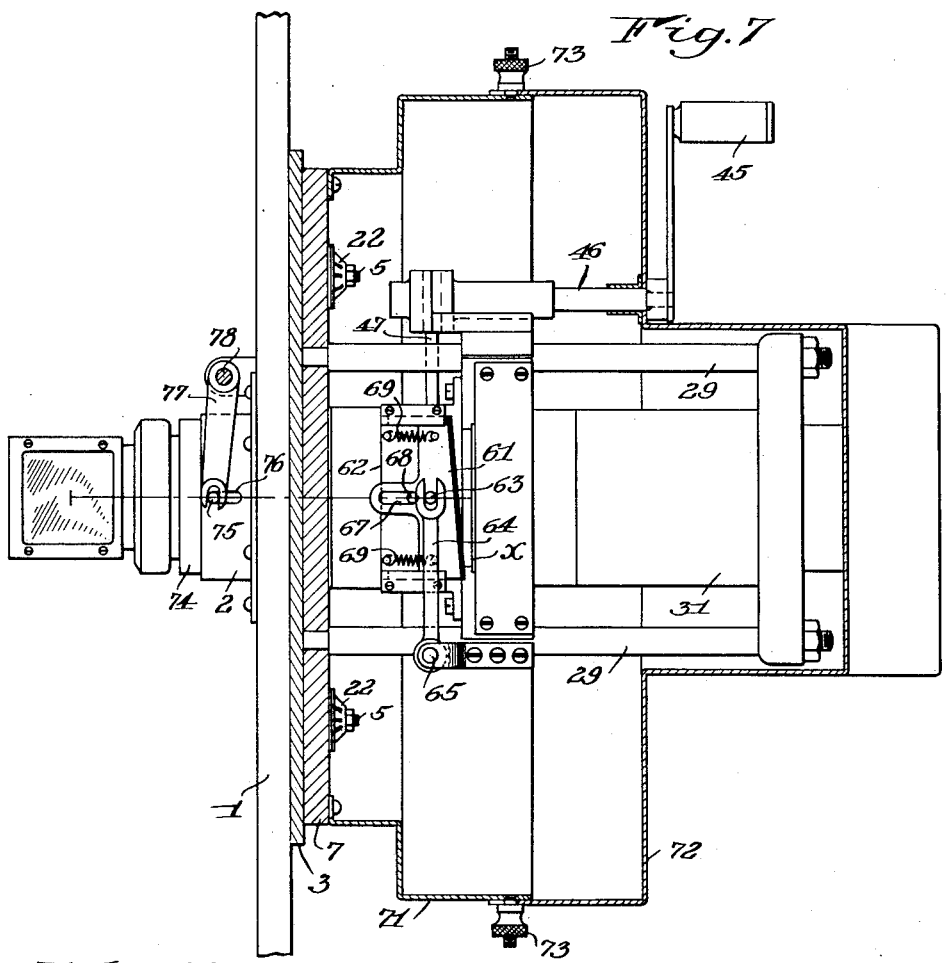
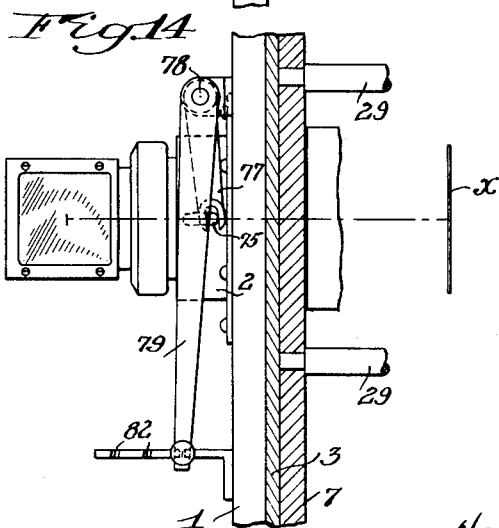

Oct. 3, 1944.    S. W. LANGDON    2,359,429
PHOTOGRAPHIC CAMERA
Filed July 29, 1943    10 Sheets-Sheet 7

INVENTOR.
Samuel W. Langdon
BY Harold E. Stonebraker
his Attorney

Oct. 3, 1944. S. W. LANGDON 2,359,429
PHOTOGRAPHIC CAMERA
Filed July 29, 1943 10 Sheets-Sheet 8

INVENTOR.
Samuel W. Langdon
BY Harold E. Stonebraker
his Attorney

INVENTOR.
Samuel W. Langdon
By Harold E. Stonebraker
his Attorney

Oct. 3, 1944.    S. W. LANGDON    2,359,429
PHOTOGRAPHIC CAMERA
Filed July 29, 1943    10 Sheets-Sheet 10

INVENTOR.
Samuel W. Langdon
BY Harold E. Stonebraker,
his Attorney

Patented Oct. 3, 1944

2,359,429

UNITED STATES PATENT OFFICE 2,359,429

PHOTOGRAPHIC CAMERA

Samuel W. Langdon, Rochester, N. Y.

Application July 29, 1943, Serial No. 496,624

15 Claims. (Cl. 95—31)

This invention relates to a photographic camera, with more particular reference to the type employing a roll of light-sensitive material that is fed and cut off after each exposure as in the case of identification cameras although also applicable to studio work and other uses, and it has for its purpose to afford a simple, practical, and efficient arrangement that enables positioning and feeding the light-sensitive material either horizontally or vertically with relation to the lens and exposure openings so that the image will appear either horizontally or vertically on a rectangular exposure field.

Another object of the invention is to provide a compact mechanism that enables varying the length of the light-sensitive material exposure field and at the same time automatically changes the relative position of the light-sensitive material supporting and feeding mechanism in relation to the lens and exposure opening so that the latter are always centered properly in relation to different sizes of exposure field of the light-sensitive material.

An additional purpose of the invention is to afford a simple and practical mechanism for controlling and feeding the light-sensitive material from an endless roll and for mounting these parts in such a manner that the entire mechanism can be adjusted rotatively around the exposure opening and also radially thereof in order to effect the desired changes in size of the light-sensitive material exposure field and the centering of the exposure field in relation to the lens and exposure opening.

A further object of the invention is to afford practical and effective means for mounting light-sensitive material supporting and feeding devices on a wall of a camera in such a manner as to permit rotative adjustment around the exposure opening through an angle of 90° and radial adjustment crosswise of the exposure opening for effecting the centering of the light-sensitive material.

Still another purpose of the invention is to provide simple and practical connecting mechanism between the control for the light-sensitive material feeding mechanism and the means for adjusting the supporting and feeding mechanism radially of the exposure opening, so that such latter adjustment shall be automatically effected in accordance with a change in the extent or length of movement of the material feeding mechanism.

Still a further object of the invention is to provide simple and efficient gripping and feeding devices arranged to afford maximum compactness and to guard the paper more effectively against light leakage, and an efficient structure that combines supporting and carrier plates, permitting radial adjustment of the carrier plate and rotative adjustment of both plates when the carrier plate is in a predetermined position.

To these and other ends, the invention consists in the construction and arrangement of parts that will appear clearly from the following description when read in conjunction with the accompanying drawings, the novel features being pointed out in the claims following the specification.

In the drawings:

Fig. 2 is a horizontal sectional view showing the light-sensitive material supporting and feeding mechanism in elevation, and with the feeding plate in retracted position;

Fig. 5 is a vertical sectional view taken approximately on the line 5—5 of Fig. 3;

Fig. 6 is a horizontal sectional view taken approximately on the line 6—6 of Fig. 3;

Fig. 7 is a vertical sectional view taken approximately on the line 7—7 of Fig. 6;

Fig. 14 is a detail view in side elevation showing the lens barrel and lens adjusting mechanism;

Fig. 15 is a view in rear elevation, and

Figure 1:
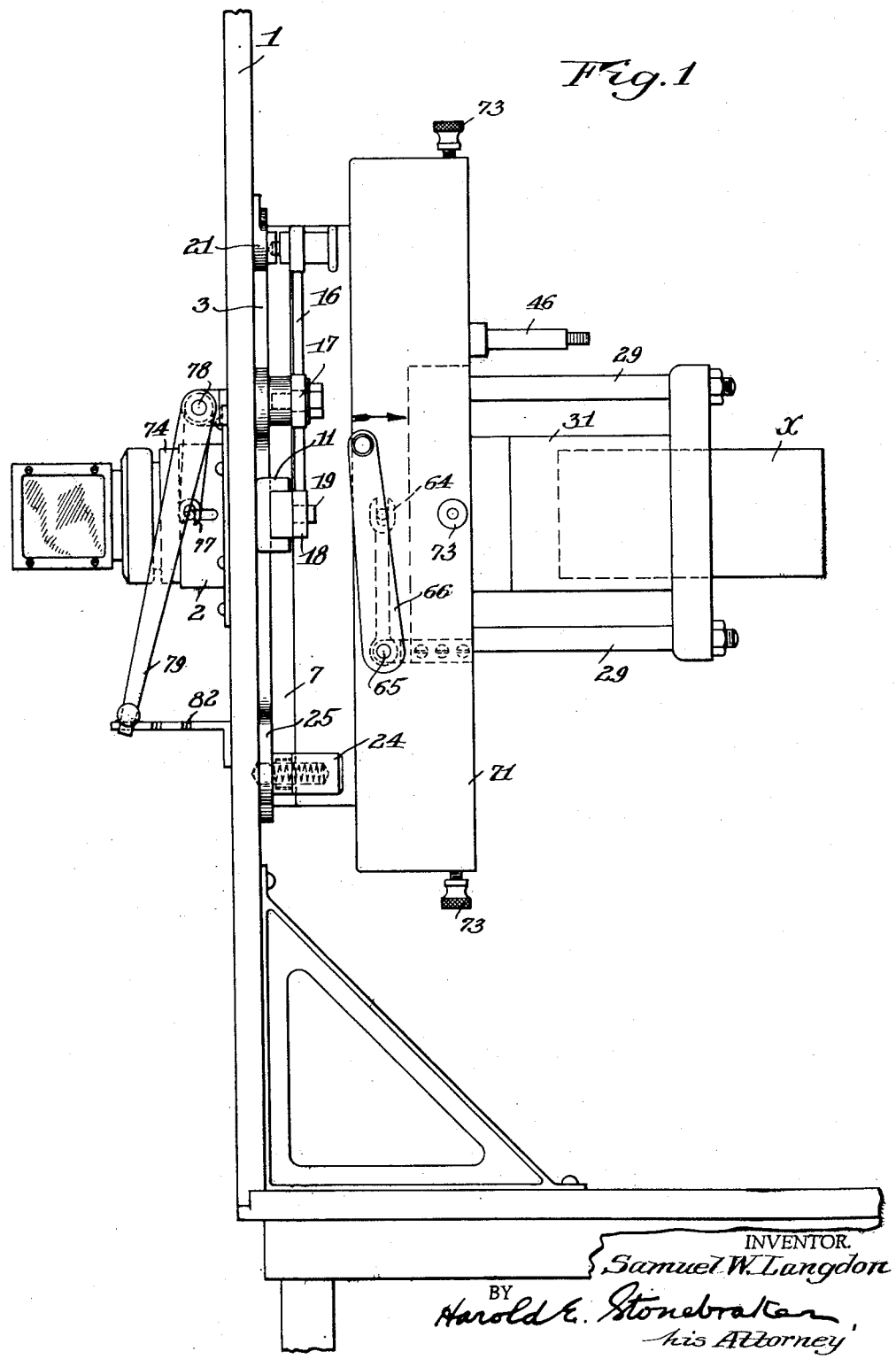
Fig. 1 is a side elevation of a photographic camera constructed in accordance with a preferred embodiment of the invention, with the housing removed.

Referring more particularly to the drawings in which like reference numerals refer to the same parts throughout the several views, 1 designates a wall of a camera body having an exposure opening and sleeve 2 located therein, see Fig. 6, and fixedly attached to the wall 1, while mounted in the sleeve 2 for inward or outward adjustment is a lens barrel that will be described more fully hereinafter.

Figure 8:
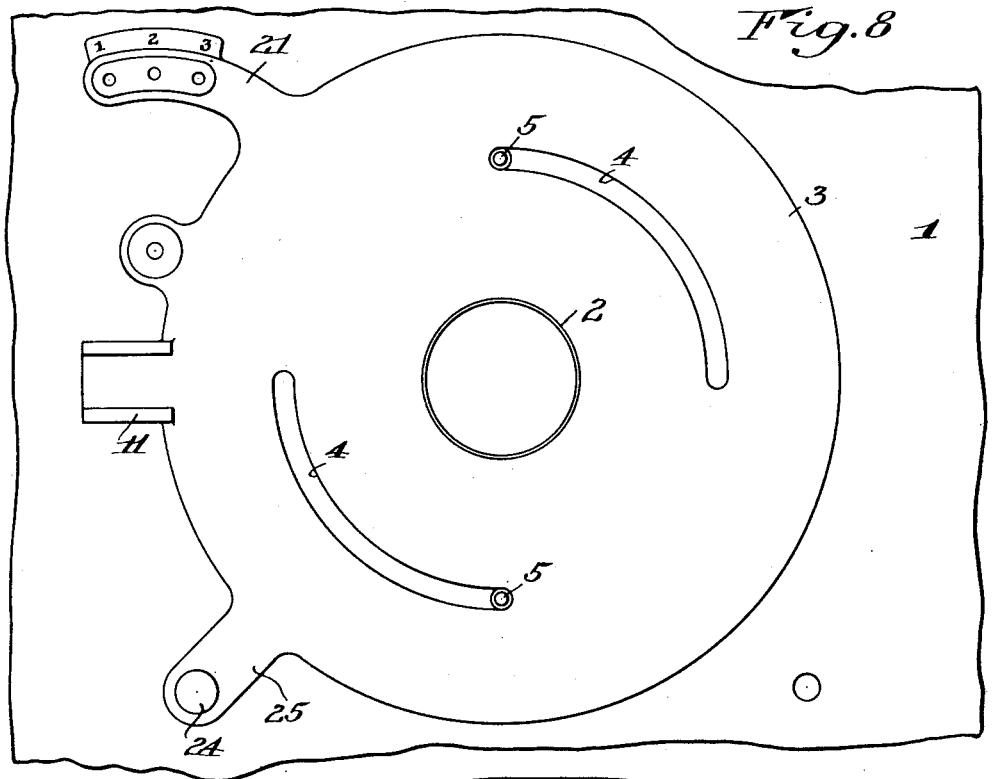
Fig. 8 is a view in elevation of the rotatively adjustable supporting plate.

Mounted on the rear surface of the wall 1 is a supporting plate 3 having an opening to receive the sleeve 2 which it surrounds and about which it is rotatively adjustable through an angle of 90° in order to permit locating the light-sensitive material and its feeding mechanism either horizontally or vertically with relation to the exposure opening and lens. To permit such adjustment, the supporting plate 3, see Figs. 5 and 8, is provided with oppositely disposed concentric arcuate guide slots 4 each extending through an angle of 90° and movable on the posts 5 fixed on the wall 1, thus permitting the supporting plate 3 to be adjusted rotatively about the exposure opening and lens a distance determined by the length of the guide slots 4 which preferably allow movement of the supporting plate through an angle of 90°.

By means of thus adjusting the supporting plate 3, it is possible to position the light-sensitive material, usually paper, either horizontally or vertically and thus locate the image either horizontally or vertically with reference to a rectangular exposure field. It is also desirable to provide means for varying the length of the exposure field on the light-sensitive paper and at the same time to center the light-sensitive material in relation to the exposure opening and lens, and to this end the light-sensitive material supporting and feeding mechanism is preferably mounted on the supporting plate 3 in such manner as to be adjustable radially or cross-wise with respect to the exposure opening.

Figure 9:
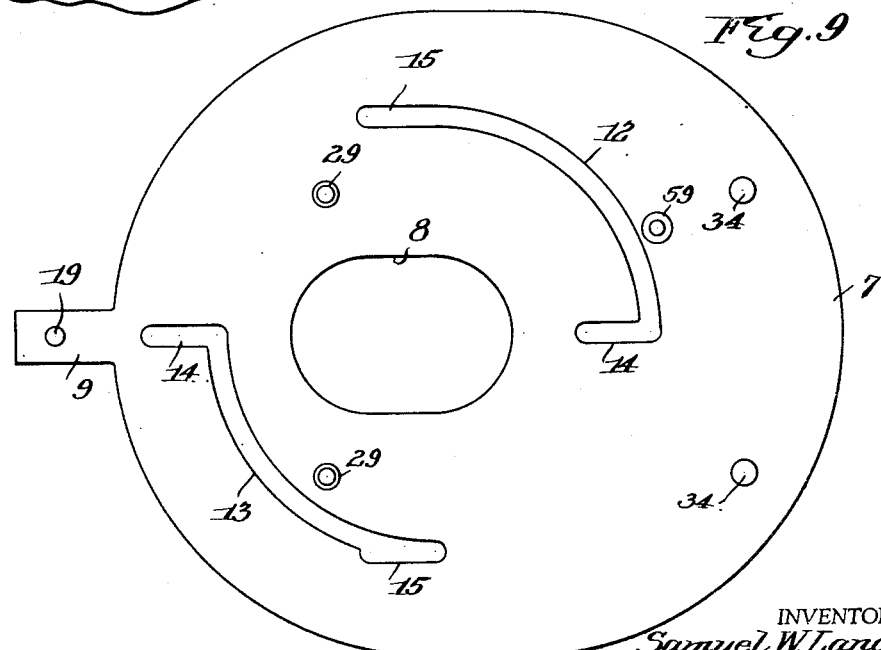
Fig. 9 is a view in elevation of the carrier plate that is mounted and adjustable on the supporting plate radially of the exposure opening, and also adjustable rotatively with the supporting plate.

This is accomplished in the present embodiment by a carrier plate 7, see Fig. 9, having an elongated central opening 8 accommodating the sleeve 2 and permitting movement of the carrier plate radially of the exposure opening. The carrier plate has a lug 9 which engages and moves in a guide 11 formed on the supporting plate 3, while 12 and 13 designate opposite concentric arcuate guide slots in the carrier plate movable on the posts 5 and adapted to be alined with the slots 4 in the supporting plate and to permit rotative adjustment of both the carrier and supporting plates on the posts 5 when the carrier plate is in the position illustrated in Figs. 3 and 12, permitting an exposure field of maximum size, as will be described more fully presently.

Figure 10:
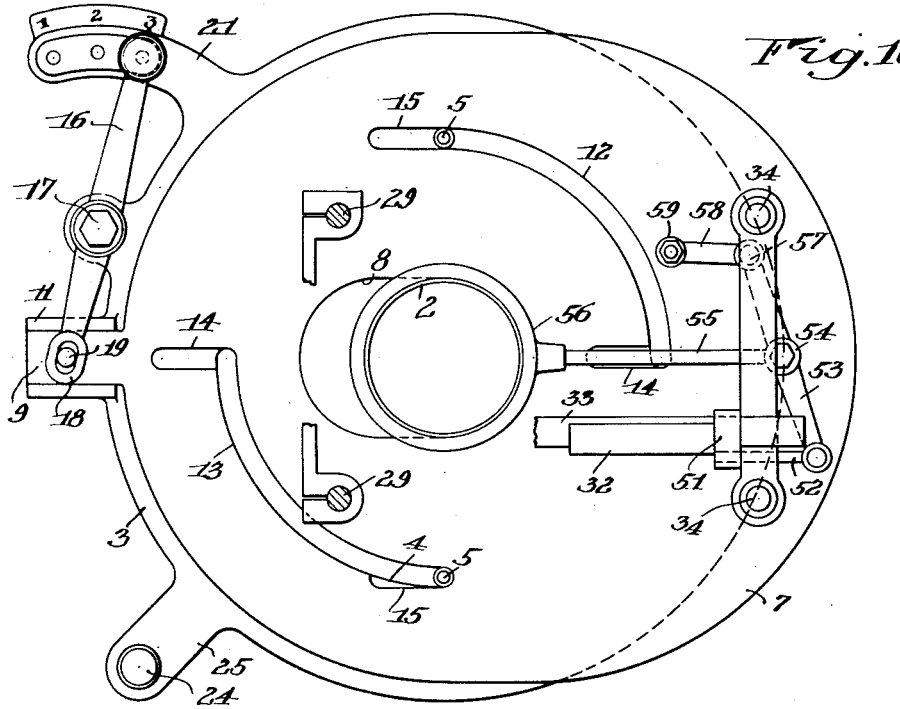
Fig. 10 is a view in elevation showing the carrier plate adjusted on the supporting plate to provide for an exposure field of maximum size.
Figure 11:
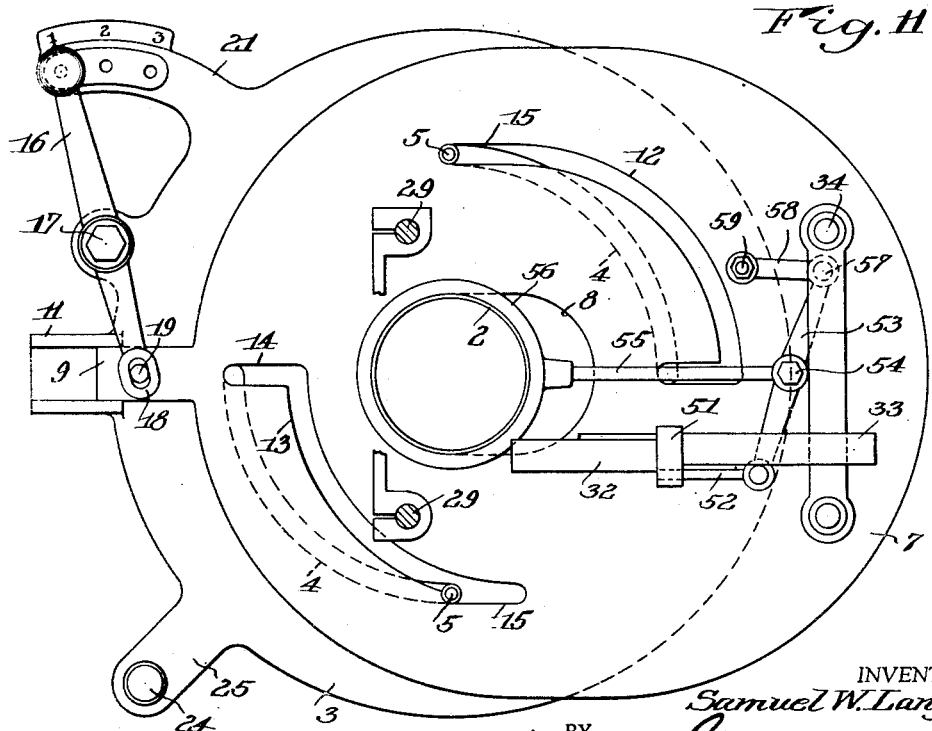
Fig. 11 is a similar view showing the carrier plate adjusted on the supporting plate to provide for an exposure field of minimum size.
Figure 12:
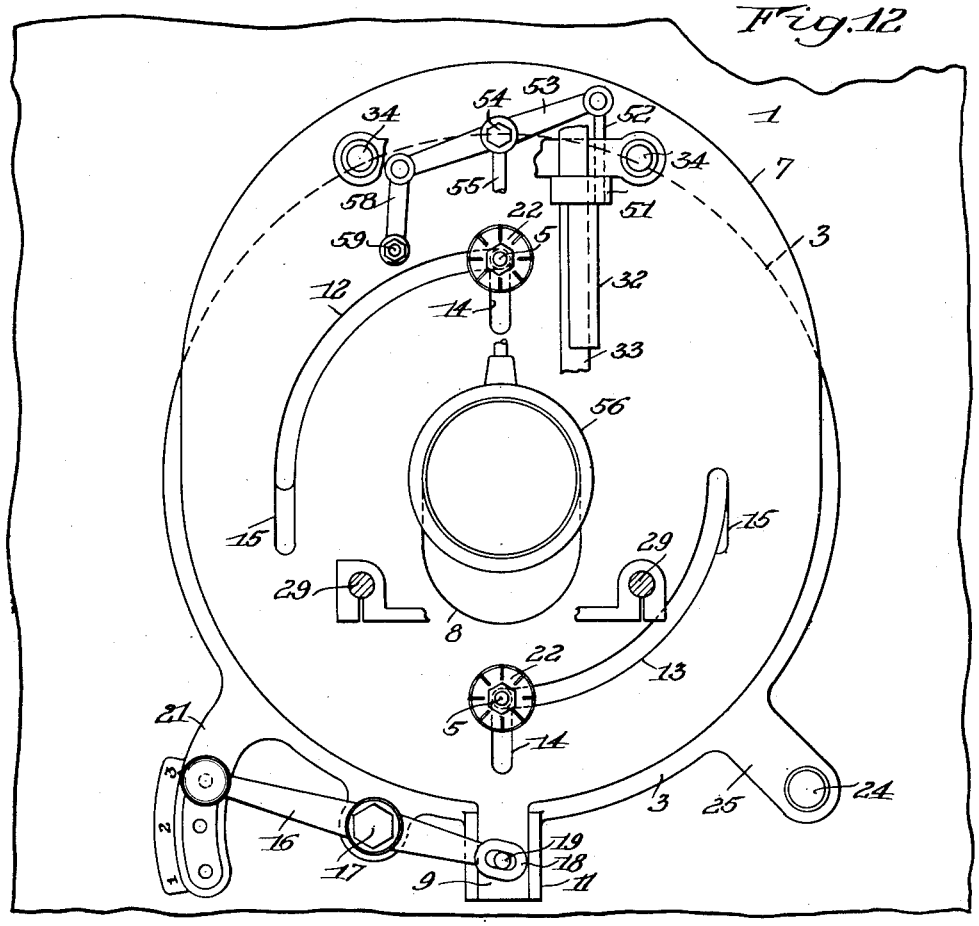
Fig. 12 is a similar view showing the supporting plate rotatively adjusted on the wall to permit movement of the light-sensitive material vertically, and with the carrier plate adjusted to provide for an exposure field of maximum size.
Figure 13:
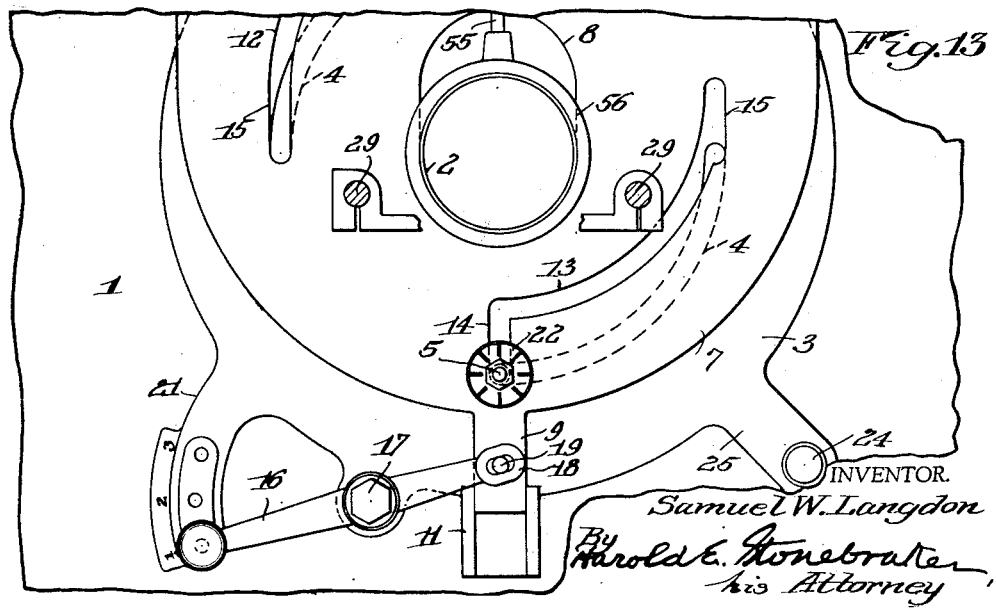
Fig. 13 is a similar view with the carrier plate adjusted to provide for an exposure field of minimum size.

In order to permit the necessary radial or endwise adjustment of the carrier plate 7 on the supporting plate 3, the arcuate slots 12 and 13 are provided at one end with alined angular straight portions 14 and at their opposite ends with straight parallel portions 15 that receive the posts 5 and permit the necessary straight line movement of the carrier plate 7 on the supporting plate 3, from the position illustrated in Fig. 10 or Fig. 12 to the position illustrated in Fig. 11 or Fig. 13 respectively. Such adjustment of the carrier plate may be effected in any suitable way as by means of a lever 16 pivoted at 17 on a bracket carried by the supporting plate 3 and connected at 18 to a pin 19 on the lug 9. The lever 16 is movable over a suitable indicating scale 21 carried by the supporting plate 3 to show the different positions for the various sizes of exposure field and may be provided with suitable frictional spring-retaining means to hold it in any adjusted position.

The carrier and supporting plates are held yieldably on the wall 1 in adjustable engagement with the posts 5 by means of the spring-retaining plates 22, see Fig. 5, which are held in place on the posts 5 against the carrier plate 7 by the nuts 23. The carrier plate 7 is thus adjustable endwise on the supporting plate 3 by the lever 16 previously described, or by other suitable means, while the supporting plate 3 and the carrier plate 7 are both rotatively adjustable about the exposure opening and lens barrel by means of a handle 24 mounted on an arm 25 carried by the supporting plate 3, so that by grasping handle 24, the supporting plate 3 and with it the carrier plate 7 and the paper supporting and feeding mechanism mounted thereon and to be described hereinafter can be accorded the necessary rotative adjustment through an angle of 90°.

In order to hold the supporting plate and with it the paper supporting and feeding mechanism in either position of adjustment, the handle 24 may be provided with suitable spring-actuated friction retaining means engageable with a recess in the wall 1. It will be understood that the light-sensitive material supporting and feeding mechanism may be adjusted on the supporting plate to afford different sizes of exposure field either when in the horizontal position shown in Figs. 10 and 11 or when in the vertical position shown in Figs. 12 and 13 to position the image either horizontally or vertically with respect to a rectangular exposure field, and while the structure disclosed shows adjustments for three possible different sizes of exposure field, there may be a large number of adjustments permitting any desirable size of exposure field, and the parts now to be described have to do with the supporting and feeding of the light-sensitive material or paper on the carrier plate 7.

The light-sensitive material supporting and feeding mechanism includes a paper supporting roll 27, see Fig. 2, mounted on arms 28 forming part of a frame carried by the posts 29 which are secured to the carrier plate 7, and as the paper X is unwound from the roll 27, it travels around the curved guide 31 and over the movable feeding plate 32, Fig. 6, which when operated effects the necessary feeding movement of the paper. The feeding plate 32 is supported and movable on tracks 33 forming part of a frame that is mounted on the posts 34 secured to the carrier plate 7, and the tracks 33 also afford a guideway through which the light sensitive material X travels, as shown in Fig. 5.

The feeding plate 32 is reciprocable on the tracks 33 and has pivotally mounted thereon a dog 35 provided with a paper gripping element 36 of rubber or other suitable material and held against the paper by a spring 37 that is connected at one end to a lug 38 and at its other end to an arm 39 on the dog 35. The rubber element 36 engages one side of the paper and holds it against the feeding plate 32 which engages the opposite side of the paper and when reciprocated forwardly, causes the rubber element 36 to engage and feed the paper along a distance corresponding to the extent of movement of the feeding plate 32 while during rearward movement of the feeding plate, the rubber element 36 moves freely over the paper.

During such rearward movement of the feeding plate, return travel of the paper is prevented by a locking dog 41 pivotally mounted on the tracks 33 and provided with a rubber gripping element 42 that is held against the paper by the spring 43 secured to the extension 44 on the dog 41 and acting in the manner already described with reference to the dog 35. Thus when the paper is moved by forward movement of the feeding plate 32, as will be described presently, the paper slides freely under the rubber gripping element 42 and when the paper is released on rearward movement of the feeding plate 32, the rubber gripping element 42 engages the paper, holding it against a relatively stationary plate, and prevents any return movement thereof as the feeding plate is moved rearwardly to feeding position.

The feeding plate 32 when in its normal or initial position covers and protects the light-sensitive material against light, and when retracted to expose the light-sensitive material, one edge of the feeding plate determines the exposure field on the light-sensitive material, and the remaining part of the feeding plate and light guard 34 constitute an effective light guard and protect the light-sensitive paper. With this arrangement of the feeding plate normally over the exposure field, it is possible to build a structure of maximum compactness since the frame and tracks that support the feeding plate need to be only twice the length of the exposure field or less.

Figure 3:
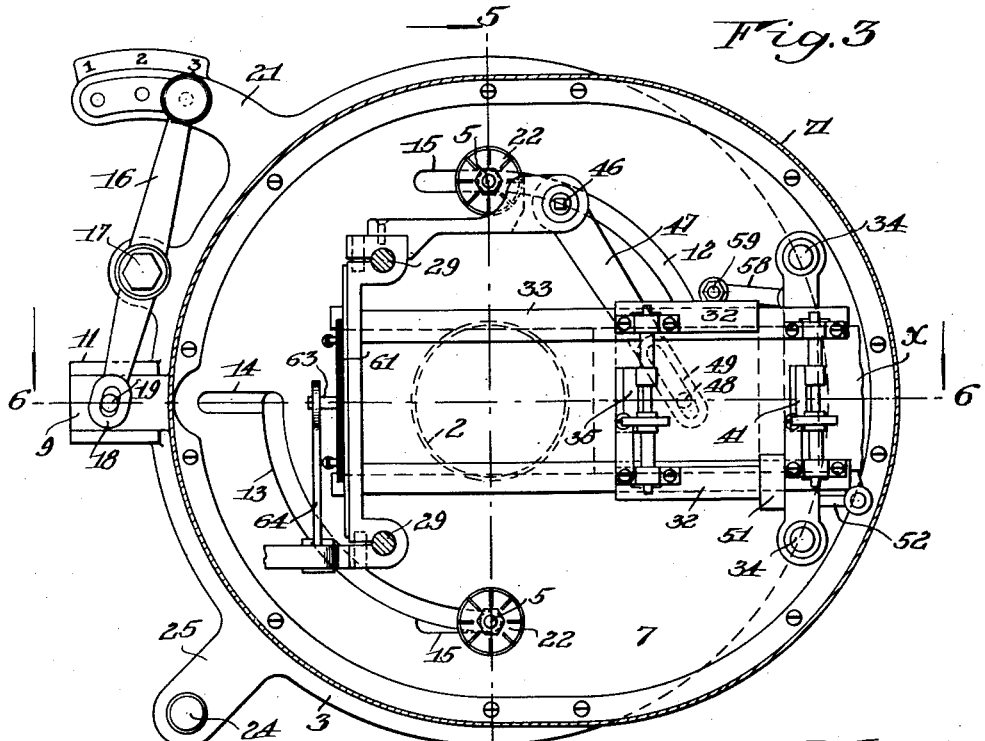
Fig. 3 is a transverse vertical sectional view through the housing, showing the material feeding plate in retracted position and with the carrier plate and adjustable means set to feed a maximum length of light-sensitive material.
Figure 4:
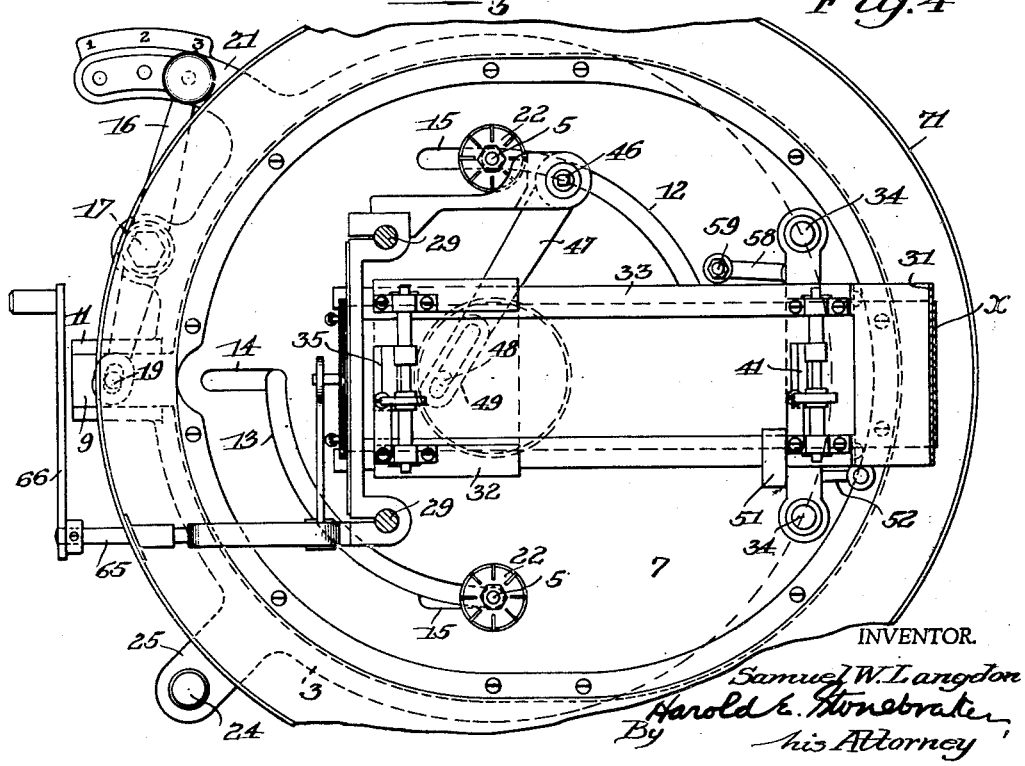
Fig. 4 is a similar view showing the position of the light-sensitive material and the feeding mechanism after the latter has been operated to feed the material.

The feeding plate 32 is operated to move the paper by means of a handle 45, see Fig. 7, mounted on a rock shaft 46 which is connected by a rod 47, see Fig. 3, to the feeding plate 32 already described, a pin 48 on the feeding plate engaging a slot 49 in the rod 47 for this purpose so that as the rock shaft 46 is oscillated by means of the handle 45, the feeding plate is moved from its initial position shown in Fig. 4, first in one direction until it engages the adjustable stop and then in the opposite direction to move the paper until stopped by the frame, the feeding plate remaining in the latter position until the operation is repeated.

In the operation of the camera, with the feeding plate normally in the position shown in Fig. 4, after the necessary adjustment is made to determine the size of the exposure field as will be described presently, the feeding plate is operated to its retracted position ready to grip and move the paper, after which the exposure is made and the paper then fed along and cut off in the manner that will now be described. It will be understood that when the feeding plate is in retracted position, the shutter may be operated in any conventional manner to effect the exposure, and the means for effecting the exposure constitutes no part of the present invention.

In order to afford different sized exposure fields on the light-sensitive material, the feeding mechanism may be controlled to effect movement of varying lengths. This is accomplished by an adjustable stop 51 slidably adjustable on one of the tracks which support the feeding plate and positionable to determine the retracted position of the feeding plate and consequently the extent of its movement and the amount of paper fed. Referring to Fig. 3, it will be observed that the feeding plate is retracted until it engages the stop 51 which is in position to permit feeding a maximum amount of paper, whereas in Fig. 11, the stop is shown adjusted to the position in which it limits the rearward movement of the feeding plate to feed a minimum amount of paper. When the stop 51 is thus adjusted to vary the extent of movement of the feeding plate and consequently the length of the exposure field of the light-sensitive material, it is desirable to move the paper holding and feeding mechanism and the carrier plate on which it is mounted a corresponding extent in relation to the lens radially of the exposure opening so that the exposure field of the light-sensitive material will always be centered with relation to the lens, irrespective of the size of the exposure field.

This is accomplished in the present embodiment by controlling the stop 51 from the adjusting means that determines the position of the carrier plate on the supporting plate. To bring this about, the stop 51 is connected by a rod 52, see Figs. 10 and 11, to a lever 53 that is pivoted at 54 on an arm 55 carried by a ring 56 surrounding the sleeve 2, Fig. 6, to permit rotative movement when the carrier plate and supporting plate are rotatively adjusted and also to allow any compensating movement for the sliding stop 51 and rod 52. The lever 53 is pivotally connected at 57 to a link 58 pivoted at 59 on the carrier plate so that when the latter is adjusted endwise on the supporting plate, it operates the lever 53 and effects corresponding adjustment of stop 51, the movement of the carrier plate and stop 51 being so correlated that when there is a change in the position of the stop, and consequently in the amount of light-sensitive material fed and the exposure field, the carrier plate and with it the entire paper holding and feeding mechanism is adjusted radially of the exposure opening to effect the necessary centering of the exposure field with reference to the exposure opening and lens.

After the light-sensitive material is exposed and fed, the exposed portion is cut off by means of the knife 61, see Figs. 6 and 7, which is slidably mounted on a plate 62 of the frame and carries a pin 63 that is engaged by the forked arm 64 secured to the rock shaft 65 which is provided at its outer end with an operating handle 66 that is manipulated to cut off the exposed portion of the paper or other light-sensitive material. The knife 61 is provided with a guiding slot 67 that travels on a relatively stationary pin 68 while 69 designates springs acting to retract the knife to initial position.

When the exposed portion of the paper or light-sensitive material is cut off, it drops into a housing or casing that includes a fixed portion 71 attached to the carrier plate 7 and a removable portion 72 that is secured to the fixed portion 71 by suitable bolts and attaching nuts 73 and is separable from the stationary portion 71 to permit inserting a fresh roll of light-sensitive material and for removing the cut off exposed portions of the light-sensitive material.

Figure 16:
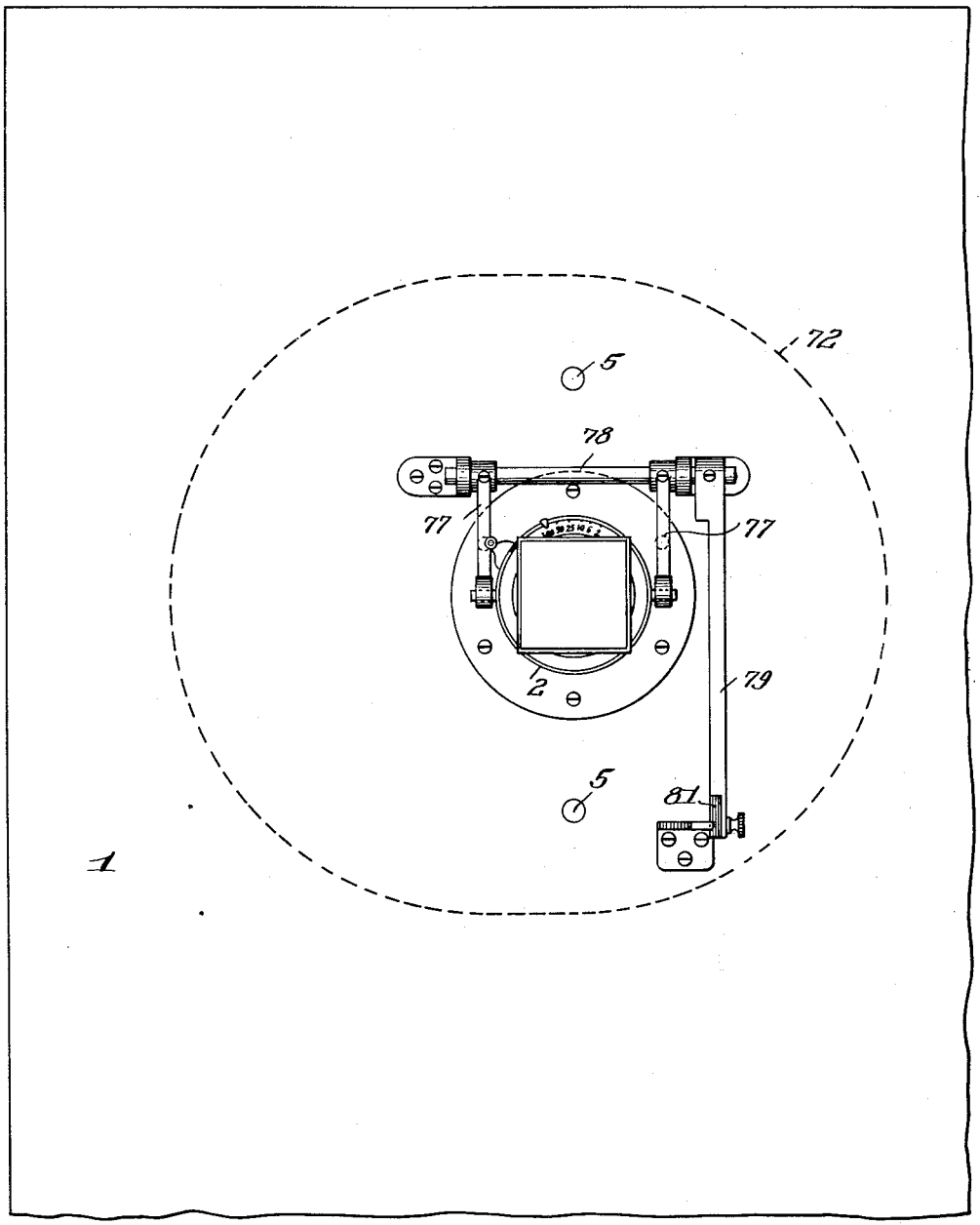
Fig. 16 is a view in front elevation.

When the carrier plate is adjusted to vary the size of the exposure field of the light-sensitive material, it is necessary to effect a corresponding adjustment of the lens toward or from the light-sensitive material and this may be accomplished in different ways as by mounting the lens in a cylindrical barrel 74, Fig. 6, that is movable endwise in the sleeve 2 and carries pins 75 movable in guide slots 76 of the sleeve 2. The pins 75 are engaged by forked arms 77, Figs. 7 and 16, which are secured to a rock shaft 78 mounted in suitable brackets attached to the front of the wall 1, and the rock shaft 78 has fixed thereon the adjusting lever 79, Figs. 1 and 16, that can be moved to different positions and is provided with a reduced edge portion 81 engageable with one of a series of notches 82 in an index plate to hold the lens barrel in adjusted position. Thus when a particular length of exposure field is selected, the lens barrel is adjusted similarly by moving the lever 79 to proper position, depending upon the adjusted position of the carrier plate, after which the exposure is made and the paper feeding mechanism operated as already described. 83 designates a ring of felt or other suitable material cemented or otherwise attached to the inner edge of the lens barrel 74, Fig. 6, to afford a secure light seal, and 84 designates a light guard or shield carried by the feeding plate 32 to further seal the interior from light.

With this construction, it is possible to change the position of the supporting and feeding mechanism for the light-sensitive material so as to locate it either horizontally or vertically with relation to the lens, and similarly to change the location of the image on the light-sensitive material, and it is also possible to vary the size of the exposure field of the light-sensitive material in either of said vertical or horizontal positions and at the same time to insure automatic centering of the image on the exposure field irrespective of the size of the latter.

While the invention has been described with reference to the particular embodiment herein disclosed, it is not confined to any of the exact details set forth, and this application is intended to cover such modifications or departures as may come within the purposes of the invention or the scope of the following claims.

I claim:

1. In a photographic camera, the combination with a wall having an exposure opening and a lens, of a carrier plate adjustable rotatively around the exposure opening, light-sensitive material holding and feeding mechanism mounted on the carrier plate, adjustable feed-limiting means operating to vary the extent of movement of the feeding mechanism, said feeding mechanism being movable independently of said feed-limiting means and into and out of engagement therewith, and devices controlled by said adjustable feed-limiting means and acting automatically to effect relative movement between the carrier plate and lens radially of the exposure opening.

2. In a photographic camera, the combination with a wall having an exposure opening and a lens, of a supporting plate rotatively adjustable in relation to the exposure opening, a carrier plate secured to the supporting plate and rotatively adjustable therewith, light-sensitive material holding and feeding mechanism secured to the carrier plate, adjustable feed-limiting means operating to vary the extent of movement of the feeding mechanism and the size of the light-sensitive material exposure field, said feeding mechanism being movable independently of said feed-limiting means and into and out of engagement therewith, and devices controlled by said adjustable feed-limiting means acting automatically to effect relative movement between the lens and the carrier plate radially of the exposure opening for centering the exposure field in accordance with changes in its size.

3. In a photographic camera, the combination with a wall having an exposure opening, of a supporting plate rotatively adjustable in relation to the exposure opening, a carrier plate secured to the supporting plate and rotatively adjustable therewith, the carrier plate being adjustable on the supporting plate in a direction radially of the exposure opening, light-sensitive material holding and feeding mechanism secured to the carrier plate, adjustable feed-limiting means operating to vary the extent of movement of the feeding mechanism and the size of the light-sensitive material exposure field, said feeding mechanism being movable independently of said feed-limiting means and into and out of engagement therewith, and devices controlled by said adjustable feed-limiting means acting automatically to effect movement of the carrier plate on the supporting plate radially of the exposure opening for centering the exposure field in accordance with changes in its size.

4. In a photographic camera, the combination with a wall having an exposure opening, of a supporting plate rotatively adjustable in relation to the exposure opening, a carrier plate secured to the supporting plate and rotatively adjustable therewith, the carrier plate being adjustable on the supporting plate in a direction radially of the exposure opening, light-sensitive material holding and feeding mechanism secured to the carrier plate, an adjustable stop positionable to vary the amount of movement of the feeding mechanism, and connecting means between said adjustable stop and the carrier plate acting to effect corresponding adjustment of the carrier plate on the supporting plate and automatically center the light-sensitive material exposure field in relation to the exposure opening.

5. In a photographic camera, the combination with a wall having an exposure opening, of a supporting plate rotatively adjustable in relation to the exposure opening, a carrier plate mounted on the supporting plate and rotatively adjustable therewith, the carrier plate being adjustable on the supporting plate in a direction radially of the exposure opening, oppositely disposed posts mounted on said wall, the supporting and carrier plates having arcuate slots movable on said posts for rotative adjustment when in predetermined positions, light-sensitive material holding and feeding mechanism mounted on the carrier plate, an adjustable stop positionable to vary the amount of movement of the paper feeding mechanism, and connecting means between said adjustable stop and the carrier plate acting to vary the position of the carrier plate on the supporting plate in accordance with movements of the adjustable stop and center the light-sensitive material exposure field with relation to the exposure opening.

6. In a photographic camera, the combination with a wall having an exposure opening and a lens barrel movable endwise of said opening, means for adjusting the lens barrel endwise of said opening, of a carrier plate adjustable rotatively around the exposure opening, light-sensitive material holding and feeding mechanism mounted on the carrier plate, adjustable feed-limiting means operating to vary the extent of movement of the feeding mechanism, said feeding mechanism being movable independently of said feed-limiting means and into and out of engagement therewith, and devices controlled by said adjustable feed-limiting means and acting automatically to effect relative movement between the carrier plate and lens radially of the exposure opening.

7. In a photographic camera, the combination with a wall having an exposure opening and a lens barrel movable endwise of said opening, means for adjusting the lens barrel endwise of said opening, of a supporting plate rotatively adjustable in relation to the exposure opening, a carrier plate secured to the supporting plate and rotatively adjustable therewith, light-sensitive material holding and feeding mechanism secured to the carrier plate, adjustable feed-limiting means operating to vary the extent of movement of the feeding mechanism and the size of the light-sensitive material exposure field, said feeding mechanism being movable independently of said feed-limiting means and into and out of engagement therewith, and devices controlled by said adjustable feed-limiting means acting automatically to effect relative movement between the lens and the carrier plate radially of the exposure opening for centering the exposure field in accordance with changes in its size.

8. In a photographic camera, the combination with a wall having an exposure opening and a lens barrel movable endwise of said opening, means for adjusting the lens barrel endwise of said opening, of a supporting plate rotatively adjustable in relation to the exposure opening, a carrier plate secured to the supporting plate and rotatively adjustable therewith, the carrier plate being adjustable on the supporting plate in a direction radially of the exposure opening, light-sensitive material holding and feeding mechanism secured to the carrier plate, adjustable feed-limiting means operating to vary the extent of movement of the feeding mechanism and the size of the light-sensitive material exposure field, said feeding mechanism being movable independently of said feed-limiting means and into and out of engagement therewith, and devices controlled by said adjustable feed-limiting means acting automatically to effect movement of the carrier plate on the supporting plate radially of the exposure opening for centering the exposure field in accordance with changes in its size.

9. In a photographic camera, the combination with a wall having an exposure opening and a lens, of a carrier plate, light-sensitive material holding and feeding mechanism mounted on the carrier plate, adjustable feed-limiting means operating to vary the extent of movement of the feeding mechanism, said feeding mechanism being movable independently of said feed-limiting means and into and out of engagement therewith, and devices controlled by said adjustable feed-limiting means and acting automatically to effect relative movement between the carrier plate and lens radially of the exposure opening.

10. In a photographic camera, the combination with a wall having an exposure opening and a lens, of a supporting plate, a carrier plate secured to the supporting plate, light-sensitive material holding and feeding mechanism secured to the carrier plate, adjustable feed-limiting means operating to vary the extent of movement of the feeding mechanism and the size of the light-sensitive material exposure field, said feeding mechanism being movable independently of said feed-limiting means and into and out of engagement therewith, and devices controlled by said adjustable feed-limiting means acting automatically to effect relative movement between the lens and the carrier plate radially of the exposure opening for centering the exposure field in accordance with changes in its size.

11. In a photographic camera, the combination with a wall having an exposure opening and a lens, of a carrier plate adjustable radially of the exposure opening, light-sensitive material holding and feeding mechanism secured to the carrier plate, adjustable feed-limiting means operating to vary the extent of movement of the feeding mechanism and the size of the exposure field, said feeding mechanism being movable independently of said feed-limiting means and into and out of engagement therewith, and devices controlled by said adjustable feed-limiting means acting automatically to effect movement of the carrier plate radially of the exposure opening for centering the exposure field in accordance with changes in its size.

12. In a photographic camera, the combination with a wall having an exposure opening, of a supporting plate rotatively adjustable in relation to the exposure opening, a carrier plate secured to the supporting plate and rotatively adjustable therewith, the carrier plate being adjustable on the supporting plate in a direction radially of the exposure opening, light-sensitive material holding and feeding mechanism secured to the carrier plate, an adjustable stop positionable to vary the amount of movement of the feeding mechanism, connecting means between said adjustable stop and the carrier plate acting to effect corresponding adjustment of the carrier plate on the supporting plate and automatically center the light-sensitive material exposure field in relation to the exposure opening, said feeding mechanism including a reciprocable feeding plate engageable with one side of the paper, said feeding plate being initially over the exposure field and retracted to feeding position to permit exposure, a spring-actuated yieldable gripping dog carried by the feeding plate and engageable with the opposite side of the paper, and a second spring-actuated gripping dog that engages and prevents return movement of the paper.

13. In a photographic camera, the combination with a wall having an exposure opening and a lens barrel movable endwise of said opening, means for adjusting the lens barrel endwise of said opening, of a carrier plate adjustable rotatively around the exposure opening, light-sensitive material holding and feeding mechanism mounted on the carrier plate, adjustable feed-limiting means operating to vary the extent of movement of the feeding mechanism, said feeding mechanism being movable independently of said feed-limiting means and into and out of engagement therewith, devices controlled by said adjustable feed-limiting means and acting automatically to effect relative movement between the carrier plate and lens radially of the exposure opening, said means for adjusting the lens barrel including pins carried by the lens barrel, forked arms engaging said pins, a rock shaft on which said forked arms are fixed, an adjusting lever fixed to said rock shaft, and an index plate with which said adjusting lever is adjustably engageable to change the position of the lens barrel.

14. In a photographic camera, the combination with a wall having an exposure opening, of a supporting plate rotatively adjustable in relation to the exposure opening, a carrier plate mounted on the supporting plate and rotatively adjustable therewith, the carrier plate being adjustable on the supporting plate in a direction radially of the exposure opening, oppositely disposed posts mounted on said wall, the supporting and carrier plates having arcuate slots movable on said posts for rotative adjustment when in predetermined positions, the slots in the carrier plate having alined angular portions at one end and parallel straight portions at the opposite ends permitting slidable adjustment of the carrier plate on the posts and supporting plate, light-sensitive material holding and feeding mechanism mounted on the carrier plate, an adjustable stop positionable to vary the amount of movement of the paper feeding mechanism, and connecting means between said adjustable stop and the carrier plate acting to vary the position of the carrier plate on the supporting plate in accordance with movements of the adjustable stop and center the light-sensitive material exposure field with relation to the exposure opening.

15. In a photographic camera, the combination with a wall having an exposure opening, of a carrier plate adjustable radially of the exposure opening, light-sensitive material holding and feeding mechanism secured to the carrier plate, an adjustable stop positionable to vary the amount of movement of the feeding mechanism, and connecting means between said adjustable stop and the carrier plate acting to effect corresponding adjustment of the carrier plate and automatically center the light-sensitive material exposure field in relation to the exposure opening.

SAMUEL W. LANGDON.